(12) United States Patent
Chin et al.

(10) Patent No.: US 10,079,773 B2
(45) Date of Patent: *Sep. 18, 2018

(54) HIERARCHICAL FAIRSHARE OF MULTI-DIMENSIONAL RESOURCES

(71) Applicant: International Business Machines Corporation, Armonk, NY (US)

(72) Inventors: Alicia E. Chin, Ontario (CA); Michael Feiman, Richmond Hill (CA); Zhenhua Hu, Toronto (CA); Zhimin Lin, Scarborough (CA); Jian Tan, San Jose, CA (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/869,089

(22) Filed: Sep. 29, 2015

(65) Prior Publication Data

US 2017/0093741 A1 Mar. 30, 2017

(51) Int. Cl.
*H04L 12/911* (2013.01)
*H04L 12/867* (2013.01)
*H04L 29/08* (2006.01)

(52) U.S. Cl.
CPC ............ *H04L 47/70* (2013.01); *H04L 47/629* (2013.01); *H04L 47/782* (2013.01); *H04L 67/1074* (2013.01)

(58) Field of Classification Search
CPC ... H04L 47/70; H04L 67/1074; H04L 47/629; H04L 47/782
See application file for complete search history.

(56) References Cited

U.S. PATENT DOCUMENTS

| | | | | |
|---|---|---|---|---|
| 6,625,709 B2* | 9/2003 | Aiken | ................... | G06F 9/5016 711/170 |
| 7,360,219 B2* | 4/2008 | Rhine | ................... | G06F 9/5038 718/102 |
| 8,732,307 B1* | 5/2014 | Zhu | ................... | H04L 29/08144 709/226 |

(Continued)

OTHER PUBLICATIONS

"Hierarchical Fairshare of Multi-Dimensional Resources", U.S. Appl. No. 14/953,453, filed Nov. 30, 2015.

(Continued)

*Primary Examiner* — Uzma Alam
(74) *Attorney, Agent, or Firm* — Isaac J. Gooshaw

(57) ABSTRACT

A method to determine a hierarchical fair share of resources among one or more scheduling peers. The method determines a greatest fairness difference between the usage percentage difference of a most-served competing peer and that of a least-served competing peer. The method determines a greatest accumulated fairness difference between the accumulated usage percentage difference of the most-served competing peer and that of the least-served competing peer. The method adjusts a resource allocation such that resources from the most-served competing peer are allocated to the least-served competing peer if an adjustment condition is met, wherein the adjustment condition is based on one or both of i) the greatest fairness difference, and ii) whether the greatest accumulated fairness difference exceeds at least one threshold.

25 Claims, 4 Drawing Sheets

(56) References Cited

U.S. PATENT DOCUMENTS

| | | | | |
|---|---|---|---|---|
| 2008/0103861 | A1* | 5/2008 | Zhong | G05B 19/41865 705/80 |
| 2008/0195450 | A1* | 8/2008 | Cho | G06Q 10/0631 705/7.12 |
| 2011/0185064 | A1* | 7/2011 | Head | G06F 9/5077 709/226 |
| 2013/0111491 | A1* | 5/2013 | Glew | G06F 11/30 718/104 |
| 2013/0138816 | A1* | 5/2013 | Kuo | G06F 9/5011 709/226 |
| 2013/0178219 | A1* | 7/2013 | Lee | H04W 72/04 455/450 |
| 2014/0180740 | A1* | 6/2014 | Dasgupta | G06Q 10/06311 705/7.14 |
| 2014/0337532 | A1* | 11/2014 | Arnette | G06F 9/4881 709/226 |
| 2015/0358829 | A1* | 12/2015 | Arnott | H04W 72/06 455/454 |
| 2015/0381453 | A1* | 12/2015 | Skjolsvold | H04L 43/0876 709/224 |
| 2016/0057076 | A1* | 2/2016 | Zlati | H04L 47/783 709/201 |
| 2017/0054592 | A1* | 2/2017 | Olrog | G06F 9/5027 |

OTHER PUBLICATIONS

IBM Appendix P, list of IBM patents or patent applications treated as related, pp. 1-2.

Dolev et al., "No Justified Complaints: On Fair Sharing of Multiple Resources", pp. 1-12, provided in post disclosure dated Dec. 10, 2014.

Klusacek et al., "Multi-Resource Aware Fairsharing for Heterogeneous Systems", pp. 1-17, provided in post disclosure dated Dec. 10, 2014.

Joe-Wong et al., "Multi-Resource Allocation: Fairness-Efficiency Tradeoffs in a Unifying Framework", pp. 1-9, provided in post disclosure dated Dec. 10, 2014.

* cited by examiner

HIERARCHICAL FAIRSHARE OF MULTI-DIMENSIONAL RESOURCES

BACKGROUND OF THE INVENTION

The present invention relates generally to the field of resource sharing in a multiprocessing system and more particularly to the fair sharing and utilization of multi-dimensional resources among multiple users in a multiprocessing system.

Multiprocessing systems (e.g., servers and datacenters) often execute a spectrum of jobs concurrently and share the resources (e.g., CPUs, CPU time, memory, special GPU processors, disk space, software licenses, etc.) of the system among the executing jobs. The resources a job requires to execute without constraint varies over time and among the types of resources that it utilizes. Since resources in a multiprocessor system are finite, approaches that share resources fairly among jobs that compete for them have been developed. Some issues addressed in a sharing scheme include the notion of fairness (i.e., how it is defined), the types of resources managed in the sharing, and the way the definition of fairness is implemented. A resource is usually allocated by a scheduler to jobs of a consumer according to a share ratio configured for this consumer. For example, a scheduler allocates a number of CPU cores out of a total number of CPU cores to jobs that are submitted by a user group according to a share ratio configured for this user group among other user groups.

As jobs are submitted from resource consumers that are often organized in hierarchies such as groups and sub-groups, or projects and sub-projects, often a hierarchical model is applied to scheduling jobs in a system in which the resources allocated to a parent consumer are available first to its child consumers, then to other consumers if there are still resources left. An approach based on such a model is often called a hierarchical fairshare model.

SUMMARY

A method to determine a hierarchical fair share of multi-dimensional resources among one or more scheduling peers is presented. The method includes determining a greatest fairness difference between the usage percentage difference of a most-served competing peer and the usage percentage difference of a least-served competing peer. The method further includes determining a greatest accumulated fairness difference between the accumulated usage percentage difference of the most-served competing peer and the accumulated usage percentage difference of the least-served competing peer. The method further adjusts a resource allocation such that resources from the most-served competing peer are allocated to the least-served competing peer if an adjustment condition is met, wherein the adjustment condition is based on one or both of i) the greatest fairness difference, and ii) whether the greatest accumulated fairness difference exceeds at least one threshold.

DETAILED DESCRIPTION

Figure 1:
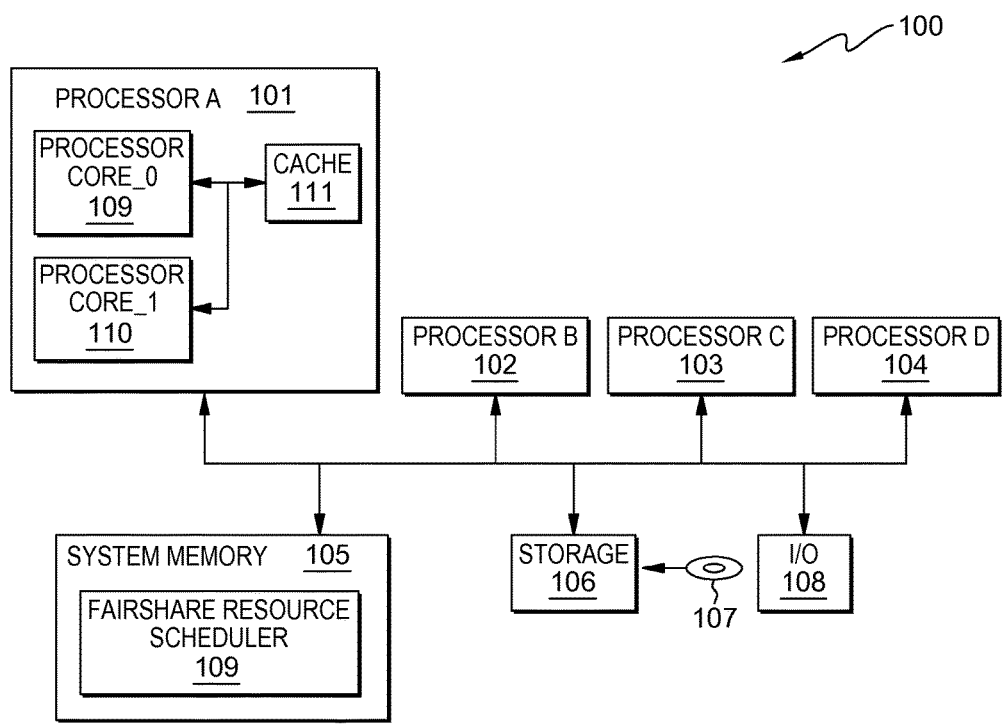
FIG. 1 depicts a block diagram of a multiprocessor computing system, in accordance with an embodiment of the present invention.

In a hierarchical fairshare model, resource consumers in a system are organized in a hierarchy, in which a consumer (a job) can have a parent consumer and multiple child consumers. A root consumer has no parent consumer. A leaf consumer has no child consumers. In the non-digital world, a consumer can be an organization, department, project, user group, or user. A workload is a unit of compute work such as a job, task, session, stage, or step, which is submitted by a consumer. In this document, "job" is often used in place of "workload", Based on resource distributions, a parent consumer may have a shared resource pool to be shared by its child consumers as scheduling peers (or simply peers, i.e., things that are allocated shared resources according to their share ratios relatively) competing for resources in the pool. A competing scheduling peer, or a competing peer, is a peer that demands more resources to run its workloads than its configured share ratio. A fairshare policy is enforced such that a scheduling of resources is generated among the competing peers such that the workloads of the competing peers will use the right amounts of various resources according to their configured share ratios.

In certain embodiments, a hierarchical fairshare model is configured to prevent a user from easily conveying incorrect information that would result in an allocation of resources that would violate their configured share ratio, i.e., the embodiment is more strategy-proof. In certain embodiments, a hierarchical fairshare model is configured to reduce the occurrence of allocations of resources such that any user is made better off at the expense of another user, i.e., the embodiment is more Pareto-efficient. In certain embodiments, a hierarchical fairshare model is configured to decrease the level of envy felt by users, i.e., the embodiment is more envy-free since users experience a decreased preference for the resources allocated to another user.

Researchers have found that it is difficult for a fairshare technique to have these attributes while fairly sharing multi-dimensional resources, a term given to resources of different types (e.g., CPU's and memory are different "dimensions"). For example, a technique called Dominant Resource Fairness (DRF) is strategy-proof, Pareto-efficient, and envy-free, but does not consider all the different resources that a job shares. DRF considers (in its implementation of fairness) only a resource that a job has the greatest share of, relative to the shares of that resource given to other jobs.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Hierarchical multi-dimensional resource sharing among scheduling peers is challenging for resource allocation and workload scheduling because workloads use resources in different dimensions, where a dimension is a resource type (e.g., RAM). The resource requirements and usages for a scheduling peer are different in different dimensions. The complexity of this environment leads to a large number of possibilities for hierarchical multi-dimensional resource sharing among scheduling peers. In addition, what is an effective approach to hierarchical multi-dimensional resource sharing among scheduling peers in one scenario may be very ineffective in another. Thus, acceptable solutions to hierarchical multi-dimensional resource sharing among scheduling peers are not forthcoming.

For example, an approach called Dominant Resource Fairshare attempts to address this problem by comparing a dominant dimension of each scheduling peer. A dominant dimension for a scheduling peer is the resource for which the scheduling peer has the greatest share among the resources that it shares with other scheduling peers. While effective in some scenarios, this approach has disadvantages because resources in different dimensions are compared (e.g., a comparison of CPU usage in one peer with memory usage in another peer) and because only the dominant dimension for each scheduling peer is considered while non-dominant dimensions are not considered. Thus, Dominant Resource Fairshare loses its effectiveness in certain scenarios.

In hierarchical resource sharing, resource consumers in a system are organized in a hierarchy, in which a consumer can have a parent consumer and multiple child consumers. A root consumer has no parent consumer. A leaf consumer has no child consumers. A consumer can be an organization, department, project, user group, user, job, or task.

Based on configured resource sharing plans and runtime resource distributions, a consumer can own some resources, borrow some unused resources from other consumers, or share resources with other consumers in a shared resource pool. There is a global shared resource pool at the root consumer level to be shared by everyone. A consumer at any level in the hierarchy can also have its own shared resource pool to be shared by its child consumers as scheduling peers competing for resources in the pool.

In general, a fairshare policy is a policy enforced by a scheduler within a pool among the competing peers such that workloads of the competing peers will use amounts of resources according to each of their configured share ratios $(S_1, S_2, \ldots, S_m)$. For example, assume that there are 3 child consumer peers under a consumer, and their configured share ratios are peer1 gets 5 shares, peer2 gets 3 shares, and peer3 gets 2 shares. If their parent consumer has 100 resource units in the resource pool shared by the 3 peers, peer1 should get 50 deserved resource units, peer2 should get 30, and peer3 should get 20, providing they all have enough workloads to use the resource units. But, for example, if peer1 only has 20 workloads to use 20 units, peer2 has 200 workloads to use 200 units, and peer3 has 100 workloads to use 100 units, then peer1 is not a competing peer. And a scheduler will allocate the 80 remaining units among competing peers of peer2 and peer3 according to their configured share ratio 3:2, therefore peer2 should get (80*3)/5=48 deserved resource units, and peer3 should get (80*2)/5=32.

In general, an over-served peer is a competing peer that gets more resources (surplus) than it should get according to its share ratio. In general, an under-served peer is a competing peer that receives fewer resources (deficit) than it should get according to its share ratio. The most-served peer is a competing peer that receives the largest surplus of resources relative to its share ratio. The least-served peer is a competing peer that gets the largest deficit. A potential starvation issue is associated using the fairshare policy on large workloads. If every workload of an under-served peer requires a large number of units to run a workload, this peer may stay under-served for a long time or permanently if, in every scheduling cycle, the number of available units is smaller than the number required by any workload of this peer. This problem is usually addressed by incrementally reserving resource units for the peer over multiple scheduling cycles, or by preempting units from the workloads of some highly-served peers. Regardless of the solution, an under-served peer must first be detected.

In general, fairshare approaches are challenged in their effectiveness when they consider multi-dimensional resources. For example, assume that a resource pool for peer1, peer2, and peer3 is comprised of 100 CPU cores and 400 GB memory and that the share ratios for the three peers are configured as 5:3:2 respectively. Additionally assume that peer1's workloads require 1 CPU core and 8 GB memory, peer2's workloads require 4 CPU cores and 2 GB memory, and peer3's workloads require 2 CPU cores and 3 GB memory. Then a challenge for a given fairshare approach is to compare the resource usages among the peers to implement fairness, and to allocate resources to the workloads of these peers while maintaining their configured share ratios of 5:3:2.

As any resource dimension can be starved in a multi-dimensional resource approach and thus prevent a workload from executing, the potential for a starvation problem increases when multi-dimensional resources are considered. Embodiments of the present invention recognize that the performance (e.g., throughput) of a computing system is often dependent in part on being able to preempt resources from over-served peers and to allocate them to under-served peers in a fair manner, i.e., in a manner that is less likely to be asserted as being unfair by users/peers.

FIG. 1 depicts multiprocessor system 100 that, in some scenarios and embodiments, contains processor A 101, processor B 102, processor C 103, processor D 104, system memory 105, storage 106, hard disk 107, and I/O 108. Processor A 101 is a multicore processor that contains processor core_0 109, processor core_1 110, and L2 cache 111. The internal structures of processor B 102, processor C 103, and processor D 104 are essentially similar to that of processor A 101. Processor A 101, processor B 102, processor C 103, processor D 104 can compute separate independent jobs or cooperatively compute independent pieces of one or more jobs in parallel. System memory 105 contains fairshare resource scheduler 109. In one embodiment, resource scheduler 109 is a computer program that is configured to monitor resource usages among jobs executing on multiprocessor system 100. Fairshare resource scheduler 109 allocates, de-allocates, and reallocates resources among the currently executing jobs to maintain fairness and to enhance performance.

Figure 2:
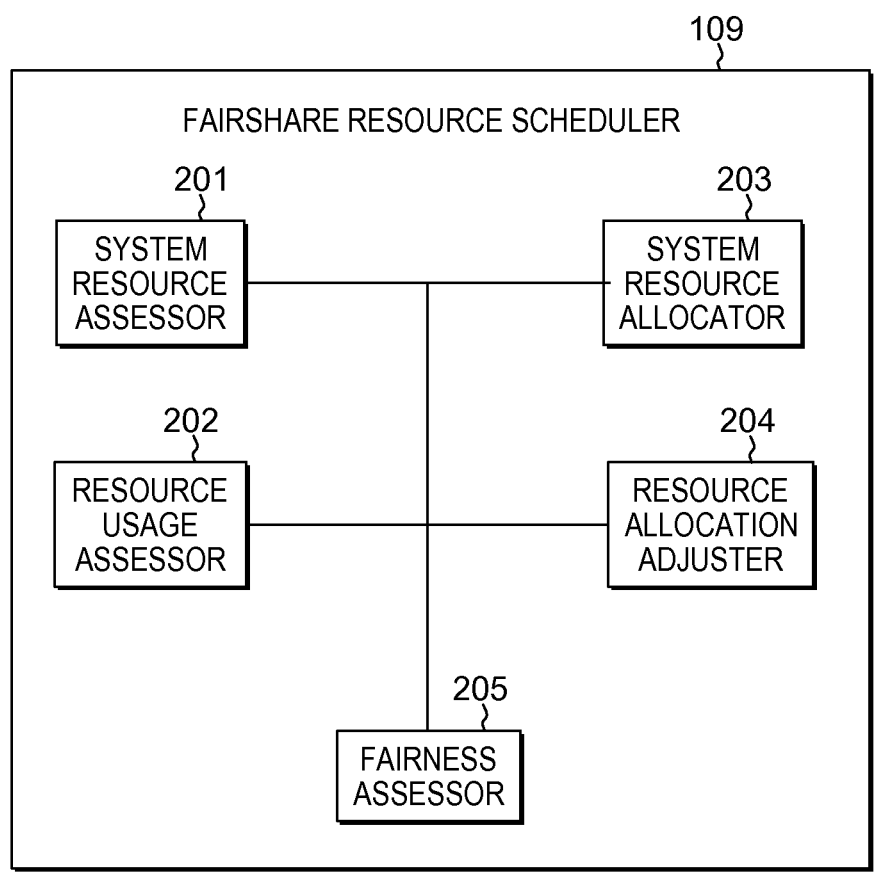
FIG. 2 depicts a block diagram of the fairshare resource scheduler that is depicted in FIG. 1, in accordance with an embodiment of the present invention.

FIG. 2 depicts fairshare resource scheduler 109 in more detail. In some scenarios and embodiments, fairshare resource scheduler 109 is comprised of system resource assessor 201, resource usage assessor 202, resource share allocator 203, resource allocation adjuster 204, and fairness assessor 205. In an embodiment, system resource assessor 201 periodically assesses the amount and types of resources that are available for use in multiprocessor system 100. For example, the amount of RAM memory, the number of processors in multiprocessor system 100, the sizes of hard disks, and the availability and sizes of SSD's (solid state drives) and other resources are periodically logged by system resource assessor 201. In an embodiment, additional information about the performance and type of various resources is logged by system resource assessor 201. For example, the access time and types of RAM and the clock rates and types of available processors are logged. Resources can be added to and deleted from the pool of resources in multiprocessor system 100 over time for various reasons. Resource upgrades, additions, deletions, and malfunctions can affect the quantities and types of available resources in multiprocessor system 100. In an embodiment, a change in resources automatically triggers an assessment of available resources in multiprocessor system 100 by system resource assessor 201. The amounts of various available resources found by system resource assessor 201 on multiprocessor system 100 constitute a pool of resources that are shared by one or more active scheduling peers in multiprocessor system 100. A scheduling peer is a resource consumer for which allocations (a share) of the total resources in multiprocessor system 100 are made to run jobs of this consumer. The scheduling peer can also be a parent consumer that has one or more child consumers, in which case the child consumers can share the resource allocation of the parent consumer.

In some scenarios and embodiments, resource share allocator 203 receives a share ratio for a scheduling peer (e.g., from a cloud share service program or a system administrator) when jobs of the scheduling peer are submitted for execution in cluster system 100. Resource share allocator 203 assigns the share ratio (a percentage of resources) of resources to the scheduling peer and initiates the execution of the scheduling peer's jobs.

In some scenarios and embodiments, resources usage assessor 202 assesses the resources (i.e., the usage percentage) used by each active scheduling peer in multiprocessor system 100. In an embodiment, if resource usage assessor 202 determines that a resource reallocation is necessary because a resource usage unfairness has been detected, resource usage assessor 202 notifies resource allocation adjuster 204 as to which resources should be reallocated, which scheduling peers currently have the resources, and which scheduling peers should receive the resources. A gainful use of a resource by a scheduling peer results in a performance enhancement of a workload executing on the scheduling peer. In an embodiment, resources usage assessor 202 assesses the usage percentage for an active scheduling peer as the amount of multi-dimensional resources currently used by the scheduling peer and its workloads divided by the amount of multi-dimensional resources that it could gainfully use if it had access to the total resources in the pool of resources of multiprocessor system 100.

$$U = V/V_{max} \quad \text{Equation (1)}$$

In Equation 1, U is the usage percentage, V is the amount of multi-dimensional resources currently used by a scheduling peer, and Vmax is the amount of multi-dimensional resources that it could gainfully use if it had access to the total resources. Because adjustments made to the resource allocations of scheduling peers are based on an effect that an adjustment has on the usage percentages of the scheduling peers according to their configured share ratios, a fairness can be maintained.

In an embodiment, resources usage assessor 202 assesses usage percentage as the number of concurrently running workloads of a scheduling peer in a hierarchy divided by the maximum number of workloads that the scheduling peer can run if it is allocated all of the resources in the resource pool of multiprocessor system 100.

$$U_i = N_i/N_{max_i} \quad \text{Equation (2)}$$

In Equation 2, $U_i$ is the usage percentage of scheduling peer i, $N_i$ is the number of concurrently running workloads of scheduling peer i, and $N_{maxi}$ is the maximum number of workloads that scheduling peer i can run if it is allocated all of the resources in the resource pool of multiprocessor system 100 that it can gainfully use.

In an embodiment, if a scheduling peer has multiple classes of executing workload units, with each class containing one or more workloads having a common size and nature, the scheduling peer will have multiple sub-allocations of resources, a sub-allocation for each class of workloads. The resource allocation of the scheduling peer is then the sum of its sub-allocations.

In an embodiment, resources usage assessor 202 assesses a usage percentage for a scheduling peer that uses prices that are associated with each of the resources used by the scheduling peer, where a price of a resource is a function of the resource and a contention of other scheduling peers for that resource. The contention value associated with a resource increases as the number of scheduling peers that can gainfully use more of that resource increases.

$$U_i = T_i/T_{max_i} \quad \text{Equation (3)}$$

In Equation 3, $U_i$ is the usage percentage, $T_i$ is the total price currently paid by workloads of scheduling peer i, in a hierarchy level, using multi-dimensional resources ($R_1$, $R_2$, ... $R_n$) in a shared pool of resources, and $T_{max}i$ is the price that would be paid by the scheduling peer if the scheduling peer is allocated all of the resources in the resource pool of multiprocessor system 100 that it can gainfully use.

$$T_i = A_{i1}*P_{i1}(C_1) + A_{i2}*P_{i2}(C_2) \ldots A_{in}*P_{in}(C_n) \quad \text{Equation (4)}$$

Equation 4 shows how $T_i$ is evaluated in some scenarios and embodiments. In Equation 4, $C_i$ is the contention for resource $R_i$ and $P_{ij}$ is the price paid by scheduling peer i for resource $R_j$. $A_{ij}$ is the amount of resource $R_j$ that is used by scheduling peer i. $P_{ij}(C_j)$ is the price of resource $R_i$ for scheduling peer i. $P_{ij}(C_j)$ is a function of the contention, $C_j$, for resource $R_j$ and is always greater than or equal to zero. A value of $P_{ij}(C_j)$ can be different for different scheduling peers, i.e., $P_{ij}(C_j)$ can have a different value for different scheduling peers for the same resource.

In an embodiment, $P_{ij}(C_j)$ is adaptively adjusted by fairness assessor 205 based on resource contention $C_j$ for resource $R_j$ in a resource pool or a cluster. If the contention for $R_j$ increases, the value of $P_{ij}(C_j)$ increases. If the contention for $R_j$ decreases, the value of $P_{ij}(C_j)$ decreases. Otherwise the value of $P_{ij}(C_j)$ does not change. In an embodiment, the initial price of each resource is set to 1. In an embodiment, the initial price of a resource for a scheduling peer is the average price of the resource over a recent time duration.

In an embodiment, if the price of every dimension (i.e., type of resource) is equal regardless of contention, and workloads are homogeneous (i.e., they are the same size and nature), then $T_i$ and $Tmax_i$ are determined by the number of workloads that a scheduling peer i can execute concurrently a) by using only allocated resources (the value of $T_i$) and b) by using all the resources in the resource pool (the value of $Tmax_i$). Consequently $T_i/Tmax_i=N_i/Nmax_i$, i.e., $T_i/Tmax_i$ simplifies to $N_i/Nmax_i$ (Equation 2).

In an embodiment, the resource contention $C_j$ for resource $R_j$ is a fraction, $f_j$, of the total amount of $R_j$ that is currently being used by all the scheduling peers' workloads executing on multiprocessor system 100. The value of $f_j$ therefore always lies between 0 and 1 inclusive. In an embodiment, the function $P_{ij}(C_j)$ is simply a price $p_{ij}$ for resource $R_j$ that is associated with scheduling peer i, multiplied by $f_j$, and therefore $P_{ij}(C_j)=p_{ij}*f_j$. In an embodiment, a price $p_{ij}$ is adaptive to conditions in multiprocessor system 100.

In some scenarios and embodiments, fairness assessor 205 monitors the usage percentages determined by resource usage assessor 202 and determines if all currently active scheduling peers in multiprocessor system 100 are receiving a fair share of the available resources in multiprocessor system 100. In an embodiment, fairness assessor 205 receives one or more unfairness thresholds from a user of multiprocessor system 100, for example, a system administrator. In an embodiment, fairness assessor 205 determines one or more unfairness thresholds using a performance and behavior history of multiprocessor system 100. In an embodiment, fairness assessor 205 determines one or more unfairness thresholds using a set of heuristics. In an embodiment, one or more unfairness thresholds are adaptive to a nature of current conditions in multiprocessor system 100.

In an embodiment, two unfairness thresholds are used by fairness assessor 205, a mild unfairness threshold and a severe unfairness threshold. In an embodiment, fairness assessor 205 determines a greatest fairness difference between the most-served competing peer and the least-served competing peer. In an embodiment, if the greatest fairness difference is less than the mild unfairness threshold, fairness assessor 205 instructs resource allocation adjuster 204 to maintain the current resource distributions among the competing peers to ensure performance and execution continuity. Mild unfairness is tolerated if the currently running jobs of competing peers have loaded libraries, cached data, and other execution environments into various storage and memory locations such that, on balance, a resource allocation adjustment has a negative impact on the overall performance of the competing peers. Also, a toleration of mild unfairness by fairness assessor 205 is necessary to preclude unnecessarily frequent and detrimental resource allocation adjustments.

In an embodiment, if the greatest fairness difference is greater than the mild unfairness threshold and less than the severe unfairness threshold, fairness assessor 205 instructs resource allocation adjuster 204 to make some non-disruptive resource allocations that reallocate some resources from finished workloads of one or more most-served competing peers to one or more least-served competing peers. In an embodiment, the resource reallocations are performed only if the resources moved from the one or more most-served competing peers can be gainfully used by the one or more least-served competing peers. In an embodiment, the one or more most-served competing peers are notified that they will lose resources at the end of a grace period so that they can prepare for the loss of resources, and move or replicate their libraries, cached data, and other execution environment elements, if appropriate, to other or convenient locations for their current or future workloads to access.

In an embodiment, if the greatest fairness difference is greater than the severe unfairness threshold, fairness assessor 205 instructs resource allocation adjuster 204 to make some resource reallocations that interrupt some running jobs of one or more most-served competing peers, which use the reallocated resources. In an embodiment, the running jobs that are interrupted are either terminated or checkpointed so that they can be restarted at the point at which they were interrupted. In an embodiment, resources are moved from one or more most-served competing peers to one or more least-served competing peers. In an embodiment, the resource reallocations are performed only if the resources moved from the one or more most-served competing peers can be gainfully used by the one or more least-served competing peers. In an embodiment, the one or more most-served competing peers are notified that they will lose resources at the end of a grace period so that they can prepare for the loss of some or all of their resources, and move or replicate their libraries, cached data, and other execution environment elements, if appropriate, to other or convenient locations for their current or future workloads to access.

In an embodiment, if system resource assessor 201 detects that new resources have been added to multiprocessor system 100 or that resources have been freed up by completed workloads, fairness assessor 205 determines how the newly available resources are to be fairly allocated and directs resource allocation adjuster 204 to make the allocations. In an embodiment, the least-served competing peers are given priority for the newly available resources.

In an embodiment, fairness assessor 205 determines the usage percentages of resources used by competing peers and uses them to adjust and maintain fair resource allocations among the competing peers in cluster system 100. In an embodiment, if there are m competing peers in cluster system 100 at time t, resource usage assessor 202 determines the usage percentages $U_1, U_2, \ldots, U_m$ of the m competing peers $X_1, X_2, \ldots, X_m$ at time t, where the m competing peers have been configured resource share ratios $S_1, S_2, \ldots, S_m$. In an embodiment, fairness assessor 205 determines a usage percentage difference, $D_1, D_2, \ldots, D_m$, between the usage percentage and configured share ratio, for each of the m competing peers.

$$D_i(t) = \frac{U_i(t)}{\sum_{i=1}^{m(t)} U_i(t)} - \frac{S_i}{\sum_{i=1}^{m(t)} S_i} \qquad \text{Equation (5)}$$

Equation 5 shows how fairness assessor 205 determines a usage percentage difference $D_i(t)$ at time t for competing peer $X_i$. The first term in Equation 5 is a normalized usage percentage and the second term is a normalized share ratio at time t for competing peer $X_i$. $D_i(t)$ is therefore the difference between the normalized usage percentage that competing peer $X_i$ has been allocated at time t and the normalized share ratio that $X_i$ deserves at time t. If $D_i(t)=0$, then $X_i$ is just satisfied at time t. The most-served competing peer at time t has the highest $D_i(t)$, and the least-served competing peer at time t has the lowest $D_i(t)$. Then a greatest fairness difference is the difference between the usage percentage difference $D_j(t)$ of the most-served competing peer j and the usage percentage difference $D_k(t)$ of the least-served competing peer k. In an embodiment, if the greatest fairness difference exceeds an unfairness threshold, fairness assessor 205 directs resource allocation adjuster 204 to reallocate one or more resources among one or more competing peers. In an embodiment, resource allocation adjuster 204 will reallocate resources from the most-served competing peers to the least-served competing peers.

In an embodiment, for equal share (i.e. the share ratio is the same among competing peers), as an alternative to Equation 5, instead of using configured share ratios that are the same for equal share, fairness assessor 205 can determine a usage percentage difference for a competing peer as a difference between a usage percentage for the competing peer and the average usage percentage of all competing peers.

$$D_i(t) = U_i(t) - \frac{\sum_{i=1}^{m(t)} U_i(t)}{m} \qquad \text{Equation (6)}$$

If there are m competing peers, Equation 6 shows how fairness assessor 205 determines a usage percentage difference $D_i(t)$ at time t for competing peer $X_i$. Then a greatest fairness difference is the difference between the usage percentage difference $D_j(t)$ of the most-served competing peer j and the usage percentage difference $D_k(t)$ of the least-served competing peer k. In an embodiment, if the greatest fairness difference exceeds an unfairness threshold, fairness assessor 205 directs resource allocation adjuster 204 to reallocate one or more resources among one or more competing peers. In an embodiment, resource allocation adjuster 204 will reallocate resources from the most-served competing peers to the least-served competing peers.

In an embodiment, fairness assessor 205 considers an accumulation of usage percentage differences when determining if a competing peer is using more than a fair share of the resources in multiprocessor system 100. In an embodiment, fairness assessor 205 determines if a competing peer is using a small extra amount of resources that can be under an unfairness threshold, but has been using this small extra amount for a prolonged period.

$$W_i(e) = \sum_{t=s}^{t=e} D_i(t) \qquad \text{Equation (7)}$$

In an embodiment, fairness assessor 205 determines an accumulated usage percentage difference $W_i(e)$ for competing peer i at the current time e as shown in Equation 7, where s is the starting time of the current active period of competing peer i over which the accumulated percentage difference is determined and e is the end time of the current active period, s<e. In an embodiment, fairness assessor 205 evaluates $W_i(e)$ in Equation 7 with Equation 5. In an embodiment, fairness assessor 205 evaluates $W_i(e)$ in Equation 7 with Equation 6. Then a greatest fairness difference is the difference between the accumulated usage percentage difference $W_j(e)$ of the most-served competing peer j and the accumulated usage percentage difference $W_k(e)$ of the least-served competing peer k. In an embodiment, if the greatest fairness difference exceeds an unfairness threshold, fairness assessor 205 directs resource allocation adjuster 204 to reallocate one or more resources among one or more competing peers. In an embodiment, resource allocation adjuster 204 will reallocate resources from the most-served competing peers to the least-served competing peers.

In an embodiment, a determination of $W_i(e)$ includes a time decay factor function F( ) which gives less weight to a usage percentage difference that occurred in the far past than to a usage percentage difference that occurred in the recent past.

$$W_i(e) = \sum_{t=s}^{t=e} D_i(t) * F(e-t) \qquad \text{Equation (8)}$$

In an embodiment, fairness assessor 205 determines an accumulated usage percentage difference $W_i(e)$ for competing peer i at the current time e as shown in Equation 8, where s is the starting time of the current active period of competing peer i over which the accumulated percentage difference is summed, e is the end time of the current active period, s<e, and F(e−t) is a function of (e−t) with a value that decays over the far past time, t<=e. That is, the function $F(e-t_1) <= F(e-t_2)$ if $t_1 <= t_2$ as t approaches e. In an embodiment, fairness assessor 205 evaluates $W_i(e)$ in Equation 8 with Equation 5. In an embodiment, fairness assessor 205 evaluates $W_i(e)$ in Equation 8 with Equation 6. Then a greatest accumulated fairness difference is the difference between the accumulated usage percentage difference $W_j(e)$ of the most-served competing peer j and the accumulated usage percentage difference $W_k(e)$ of the least-served competing peer k. In an embodiment, if the greatest accumulated fairness difference exceeds an unfairness threshold, fairness assessor 205 directs resource allocation adjuster 204 to reallocate one or more resources among one or more competing peers. In an embodiment, resource allocation adjuster 204 will reallocate resources from the most-served competing peers to the least-served competing peers.

Figure 3:
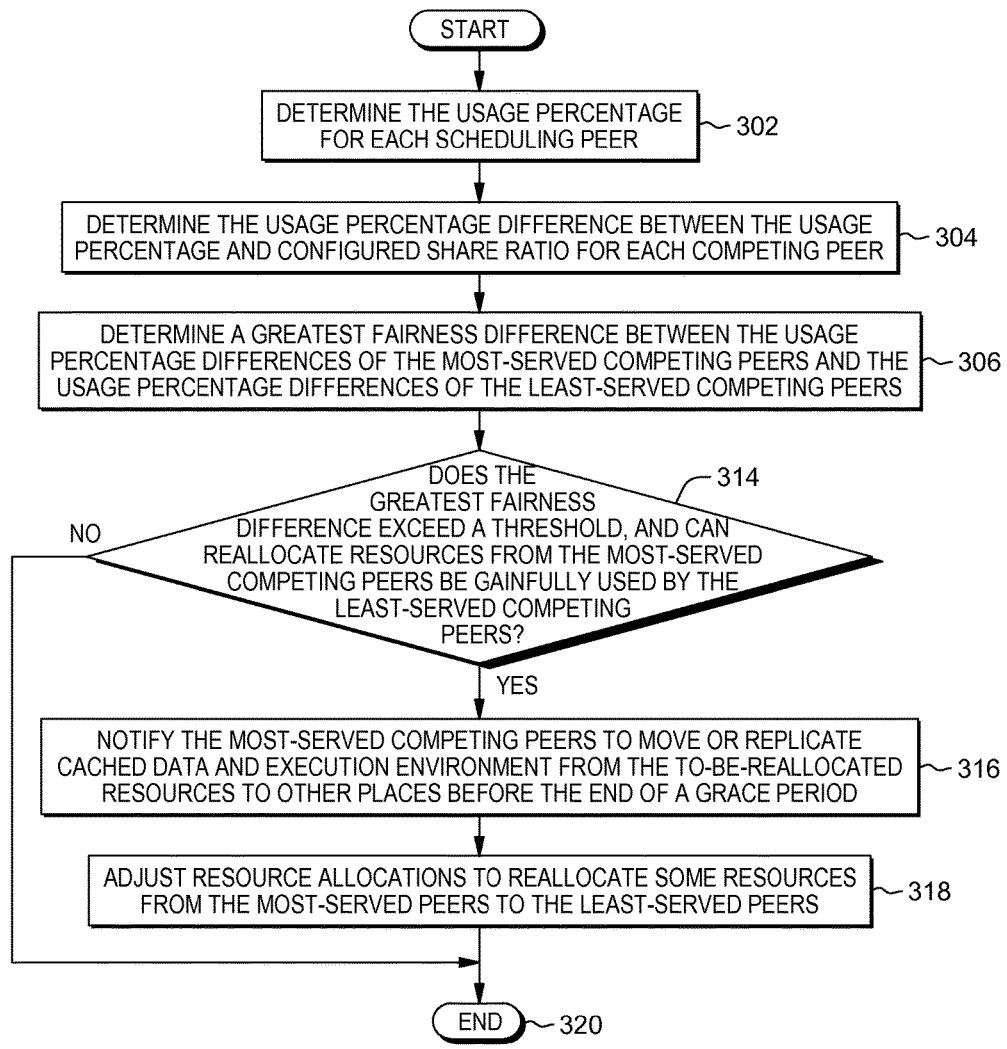
FIG. 3 is a flow chart that depicts the operation of the fairshare resource scheduler that is depicted in FIG. 2, in accordance with an embodiment of the present invention.

FIG. 3 depicts the operational steps performed by fairshare resource scheduler 109 during a fairshare resource evaluation in some scenarios and embodiments. A usage percentage for each active scheduling peer in multiprocessor system 100 is determined by resource usage assessor 202 (step 302).

Fairness assessor 205 determines a usage percentage difference for each competing peer in cluster system 100 (step 304). Fairness assessor 205 determines a greatest fairness difference between the usage percentage differences of the most-served competing peers and the usage percentage differences of the least-served competing peers (step 306).

In one embodiment, fairness assessor 205 determines if the greatest fairness difference exceeds an unfairness threshold, and reallocated resources from the most-served competing peers can be gainfully used by the least-served competing peers (decision step 314). If yes (decision step 314, Yes branch), fairness assessor 205 directs resource allocation adjuster 204 to adjust one or more resource allocations. Resource allocation adjuster 204 notifies the most-served competing peers to move or replicate cached data and execution environment from the to-be-reallocated resources to other places before the end of a grace period (step 316). Resource allocation adjuster 204 reallocates resources from the most-served competing peers to the least-served competing peers in cluster system 100 (step 318) and operations for the current fairshare resource evaluation terminate (step 320). Otherwise (decision step 314, No branch), operations for the current fairshare resource evaluation terminate (step 320).

Figure 4:
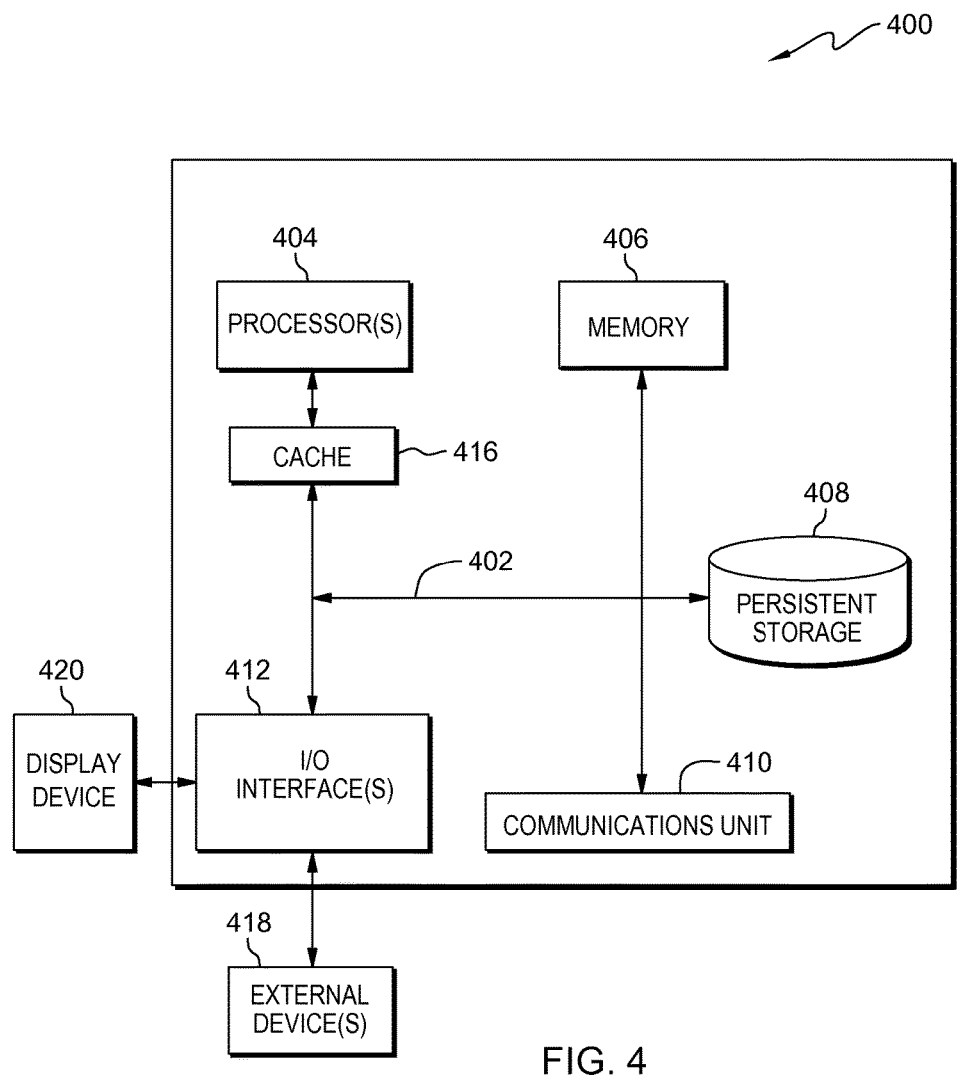
FIG. 4 depicts a block diagram of a computer system that incorporates the processor depicted in FIG. 1, in accordance with an embodiment of the present invention.

FIG. 4 depicts computer system 400 that is an example computer system that incorporates processor A 101 in processor(s) 404 and incorporates system memory 105 in memory 406. Computer system 400 includes communications fabric 402, which provides communications between computer processor 101, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory. In general, memory 406 can include any suitable volatile or non-volatile computer readable storage media. Cache 416 is a fast memory that enhances the performance of processors 101 by holding recently accessed data and data near accessed data from memory 406.

Program instructions and data used to practice embodiments of the present invention may be stored in persistent storage 408 for execution by one or more of the respective processors 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 612. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer program product to determine a hierarchical fair share of multi-dimensional resources among one or more scheduling peers, the program instructions comprising:
   one or more computer readable storage media device and program instructions stored on the one or more computer readable storage media, the program instructions comprising:
   program instructions to receive a resource allocation for each scheduling peer in a plurality of scheduling peers;
   program instructions to determine a usage percentage of each scheduling peer;
program instructions to determine a greatest fairness difference between a usage percentage difference of a most-served competing peer and a usage percentage difference of a least-served competing peer included in a pool of competing peers;
   program instructions to determine a greatest accumulated fairness difference, as accumulated over a time period, between an accumulated usage percentage difference of the most-served competing peer and an accumulated usage percentage difference of the least-served competing peer;
   program instructions to determine a usage percentage difference between the usage percentage and a configured share ratio for each competing peer; and
   program instructions to adjust a resource allocation such that resources from the most-served competing peer are allocated to the least-served competing peer when an adjustment condition is met, wherein the adjustment condition is based on both of (i) the greatest fairness difference, and (ii) whether the greatest accumulated fairness difference exceeds at least one threshold.

2. The computer program product of claim 1, further comprising program instructions, stored on the one or more computer readable storage media to determine the adjustment condition wherein, the adjustment condition includes an additional criterion, wherein the additional criterion is that one or more resources used by the most-served competing peer can be gainfully utilized by the least-served competing peer.

3. The computer program product of claim 1, further comprising:
   program instructions to determine an identity of each competing peer in the plurality of scheduling peers; and
   program instructions to determine at least one threshold.

4. The computer program product of claim 1, further comprising program instructions, stored on the one or more computer readable storage media, to determine a usage percentage of each scheduling peer, wherein each scheduling peer in the plurality of peers has one or more workloads and each workload uses multi-dimensional resources.

5. The computer program product of claim 1, further comprising program instructions, stored on the one or more computer readable storage media, to determine a usage percentage of each scheduling peer, wherein the usage percentage difference for a competing peer is a difference between the usage percentage of the competing peer that is normalized by a sum of the usage percentages of all competing peers and the configured share ratio of the competing peer that is normalized by a sum of the configured share ratios of all competing peers.

6. The computer program product of claim 1, further comprising program instructions, stored on the one or more computer readable storage media, to determine a usage percentage difference between the usage percentage and a configured share ratio for each competing peer, wherein the usage percentage difference for a competing peer is a difference between the usage percentage of the competing peer and an average usage percentage of all competing peers.

7. The computer program product of claim 1, further comprising program instructions, stored on the one or more computer readable storage media, to determine a greatest accumulated fairness difference between the accumulated usage percentage difference of the most-served competing peer and the accumulated usage percentage difference of the least-served competing peer, wherein the accumulated usage percentage difference for a competing peer is a sum of the usage percentage differences of the competing peer during a current active period.

8. The computer program product of claim 1, further comprising program instructions, stored on the one or more computer readable storage media, to determine a greatest accumulated fairness difference between the accumulated usage percentage difference of the most-served competing peer and the accumulated usage percentage difference of the least-served competing peer, wherein the accumulated usage percentage difference for a competing peer is a sum of the usage percentage differences of the competing peer during a current active period wherein each usage percentage difference is biased with a weight factor which gives less weight to a usage percentage difference that occurred near a beginning of the current active period and more weight given to a usage percentage difference that occurred near an end of the current active period.

9. The computer program product of claim 1, further comprising program instructions, stored on the one or more computer readable storage media, to determine a usage percentage of each scheduling peer, wherein the plurality of scheduling peers is in a same hierarchical level.

10. The computer program product of claim 9, further comprising program instructions, stored on the one or more computer readable storage media, to determine a usage percentage of each scheduling peer, wherein the usage percentage of a scheduling peer is a total current resource usage of all workloads of the scheduling peer in the same hierarchy level, divided by a total resource usage existent when an entire resource pool for the same hierarchy level is available for use by all workloads of the scheduling peer.

11. The computer program product of claim 1, further comprising program instructions, stored on the one or more computer readable storage media, to determine a usage percentage of each scheduling peer, wherein the usage percentage of a scheduling peer is derived from a contention of all other scheduling peers in the plurality of scheduling peers for each resource used by the scheduling peer and from a price of each resource.

12. The computer program product of claim 11, wherein the contention is a fraction of a total amount of a resource that is used by all the scheduling peers in the plurality of scheduling peers.

13. The computer program product of claim 1, wherein when resources are reallocated from the most-served competing peer, the most-served competing peer is notified that the most-served competing peer will lose resources at an end of a time period.

14. A computer system for to determine a hierarchical fair share of multi-dimensional resources among one or more scheduling peers, the computer system comprising: one or more computer processors;
one or more computer readable storage medium device;
program instructions stored on the computer readable storage medium device for execution by at least one of the one or more processors, the program instructions comprising:
program instructions to receive a resource allocation for each scheduling peer in a plurality of scheduling peers;
program instructions to determine a usage percentage of each scheduling peer;
program instructions to determine a greatest fairness difference between a usage percentage difference of a most-served competing peer and a usage percentage difference of a least-served competing peer included in a pool of competing peers;
program instructions to determine a greatest accumulated fairness difference, as accumulated over a time period, between an accumulated usage percentage difference of the most-served competing peer and an accumulated usage percentage difference of the least-served competing peer;
program instructions to determine a usage percentage difference between the usage percentage and a configured share ratio for each competing peer; and
program instructions to adjust a resource allocation such that resources from the most-served competing peer are allocated to the least-served competing peer when an adjustment condition is met, wherein the adjustment condition is based on both of (i) the greatest fairness difference, and (ii) whether the greatest accumulated fairness difference exceeds at least one threshold.

15. The computer system of claim 14, further comprising program instructions, stored on the one or more computer readable storage media to determine the adjustment condition wherein, the adjustment condition includes an additional criterion, wherein the additional criterion is that one or more resources used by the most-served competing peer can be gainfully utilized by the least-served competing peer.

16. The computer system of claim 14, further comprising:
program instructions to determine an identity of each competing peer in the plurality of scheduling peers; and
program instructions to determine at least one threshold.

17. The computer system of claim 14, further comprising program instructions, stored on the one or more computer readable storage media, to determine a usage percentage of each scheduling peer, wherein each scheduling peer in the plurality of peers has one or more workloads and each workload uses multi-dimensional resources.

18. The computer system of claim 14, further comprising program instructions, stored on the one or more computer readable storage media, to determine a usage percentage of each scheduling peer, wherein the usage percentage difference for a competing peer is a difference between the usage percentage of the competing peer that is normalized by a sum of the usage percentages of all competing peers and the configured share ratio of the competing peer that is normalized by a sum of the configured share ratios of all competing peers.

19. The computer system of claim 14, further comprising program instructions, stored on the one or more computer readable storage media, to determine a usage percentage difference between the usage percentage and a configured share ratio for each competing peer, wherein the usage percentage difference for a competing peer is a difference between the usage percentage of the competing peer and an average usage percentage of all competing peers.

20. The computer system of claim 14, further comprising program instructions, stored on the one or more computer readable storage media, to determine a greatest accumulated fairness difference between the accumulated usage percentage difference of the most-served competing peer and the accumulated usage percentage difference of the least-served competing peer, wherein the accumulated usage percentage difference for a competing peer is a sum of the usage percentage differences of the competing peer during a current active period.

21. The computer system of claim 14, further comprising program instructions, stored on the one or more computer readable storage media, to determine a greatest accumulated fairness difference between the accumulated usage percentage difference of the most-served competing peer and the accumulated usage percentage difference of the least-served competing peer, wherein the accumulated usage percentage difference for a competing peer is a sum of the usage percentage differences of the competing peer during a current active period wherein each usage percentage difference is biased with a weight factor which gives less weight to a usage percentage difference that occurred near a beginning of the current active period and more weight given to a usage percentage difference that occurred near an end of the current active period.

22. The computer system of claim 14, further comprising program instructions, stored on the one or more computer readable storage media, to determine a usage percentage of each scheduling peer, wherein the plurality of scheduling peers is in a same hierarchical level.

23. The computer system of claim 22, further comprising program instructions, stored on the one or more computer readable storage media, to determine a usage percentage of each scheduling peer, wherein the usage percentage of a scheduling peer is a total current resource usage of all workloads of the scheduling peer in the same hierarchy level, divided by a total resource usage existent when an entire resource pool for the same hierarchy level is available for use by all workloads of the scheduling peer.

24. The computer system of claim 14, further comprising program instructions, stored on the one or more computer readable storage media, to determine a usage percentage of each scheduling peer, wherein the usage percentage of a scheduling peer is derived from a contention of all other scheduling peers in the plurality of scheduling peers for each resource used by the scheduling peer and from a price of each resource.

25. The computer system of claim 24 wherein the contention is a fraction of a total amount of a resource that is used by all the scheduling peers in the plurality of scheduling peers.

\* \* \* \* \*